United States Patent [19]
Forsberg

[11] Patent Number: 5,199,005
[45] Date of Patent: Mar. 30, 1993

[54] ELECTROMAGNETIC DRIVE ASSEMBLY FOR UNDER WATER SONAR TRANSDUCER

[75] Inventor: Gerard K. Forsberg, Lauderdale Lakes, Fla.

[73] Assignee: Argotec, Inc., Ft. Lauderdale, Fla.

[21] Appl. No.: 929,233

[22] Filed: Aug. 14, 1992

[51] Int. Cl.$^5$ .............................................. H04R 9/00
[52] U.S. Cl. ................... 367/175; 367/182; 381/192; 381/194; 381/199; 381/201
[58] Field of Search ................ 367/175, 182; 381/177, 381/192, 194, 199, 201; 181/110

[56] References Cited

U.S. PATENT DOCUMENTS

| | | | |
|---|---|---|---|
| 3,593,258 | 7/1971 | Slavens | 367/182 |
| 4,237,347 | 12/1980 | Burundukov et al. | 381/192 |
| 4,492,827 | 1/1985 | Shintaku | 381/194 |
| 4,609,784 | 9/1986 | Miller | 381/201 |
| 4,783,824 | 11/1988 | Kobayashi | 381/192 |
| 4,902,996 | 2/1990 | Takahara | 381/199 |

Primary Examiner—J. Woodrow Eldred

[57] ABSTRACT

A sonar projector having a pair of opposed oscillating pistons driven by an electromagnetic assembly is provided with reduced weight and high power by forming the electromagnetic assembly with a permanent magnet structure consisting of two coaxial longitudinally juxtaposed members each having permanent magnets radially poled oppositely to the permanent magnets of the other coaxial member, each of the permanent magnets of one coaxial member forming a series magnetic circuit with one of the permanent magnets of the other coaxial member. As a result of this arrangement, the amount of iron required for pole pieces of the electromagnetic assembly is reduced without reducing power. Furthermore, the size or volume is also reduced as compared to an equivalent projector.

5 Claims, 2 Drawing Sheets

ELECTROMAGNETIC DRIVE ASSEMBLY FOR UNDER WATER SONAR TRANSDUCER

BACKGROUND OF THE INVENTION

The present invention relates generally to sonar equipment for underwater generation of sound and more particularly to the structure of an electromagnetic drive system for a sound transducer or projector having piston means for generating acoustic waves and including pressure compensation means.

In the technology of underwater sound generating equipment, three design parameters are of compelling importance. These are weight, volume and power. In many applications, the ability to maintain power or reduce volume while reducing or limiting weight is of significant importance.

In moving coil transducers, electromagnetic means including a moving coil operate to drive piston means which produce the energy. The type of electromagnetic arrangement utilized can have a significant affect upon power output and overall weight.

The development of rare earth permanent magnet materials provided opportunities to improve the designs and performance of devices, such as underwater sound transducers, which relied upon the previous generation of magnetic materials; generally ferrites and Alnico alloys.

Among such devices are the electrodynamic or "moving-coil" transducers. A typical electrodynamic transducer is the loudspeaker. However, the high cost of the new rare earth materials and the relatively satisfactory performance of existing ferrite materials provided little incentive for such applications. However, a related device, the electrodynamic sonar transducer, had much to gain.

In prior art devices, the substantial increases in magnetic flux made available by the new material for a given magnet assembly volume and weight were a welcome development because of the already high costs associated with the construction of each sonar unit. However, since increased flux density requires iron pole pieces adequate to carry this magnetic flux from the permanent magnet assembly to the air gap and return, the weight associated with the iron pole pieces can produce problems in certain applications. Thus, reducing the amount of iron required for the pole pieces without reducing the power delivered by the electromagnetic drive means can provide a significant advantage, particularly in underwater transducers where weight is an important consideration.

Accordingly, it is an object of the present invention, to provide an improved electromagnetic drive arrangement for a moving coil transducer which provides enhanced power characteristics without creating the need for increasing the weight of the iron pole pieces. Because of the particular arrangement of the permanent magnet members of the electromagnetic drive means in accordance with the present invention, pole piece weight may be reduced without decreasing power output or, conversely, power may be increased without increasing the iron required for the pole pieces, as would ordinarily be necessary with prior art devices.

SUMMARY OF THE INVENTION

Briefly, the present invention may be described as an electromagnetic, moving coil, drive assembly for a sonar projector capable of underwater operation to transmit sound energy, said projector including piston means mounted for oscillatory movement to generate sound energy, compliant means comprising gas means on one side of the piston means, compensation means for maintaining a pressure of the gas means equal to ambient hydrostatic pressure when the projector is submerged, and means for providing liquid on a side of the piston means opposite said one side for effecting communication between the piston means and open sea water on the exterior of said projector whereby the sound energy generated by the oscillatory movement of the piston means may be propagated into the ambient environment, said electromagnetic drive assembly operating to drive said piston means. In accordance with the specific improvement of the present invention the electromagnetic drive assembly comprises an inner and an outer cylindrical pole piece each arranged concentrically relative to each other to define an annular gap therebetween. Permanent magnet means are arranged within said annular gap together with moving coil means for driving said piston means. In accordance with a more specific aspect of the invention, the permanent magnet means are formed as two axial cylindrical members longitudinally spaced within said annular gap each having radially poled permanent magnets, the magnets of each of said cylindrical members being identically radially oriented with the magnets of each member being poled oppositely to the magnets of the other of said members.

The more detailed aspects of the present invention will be better understood by reference to the detailed description thereof which follows, taken in conjunction with the accompanying drawings.

DETAILED DESCRIPTION OF THE PREFERRED EMBODIMENT

Figure 1:
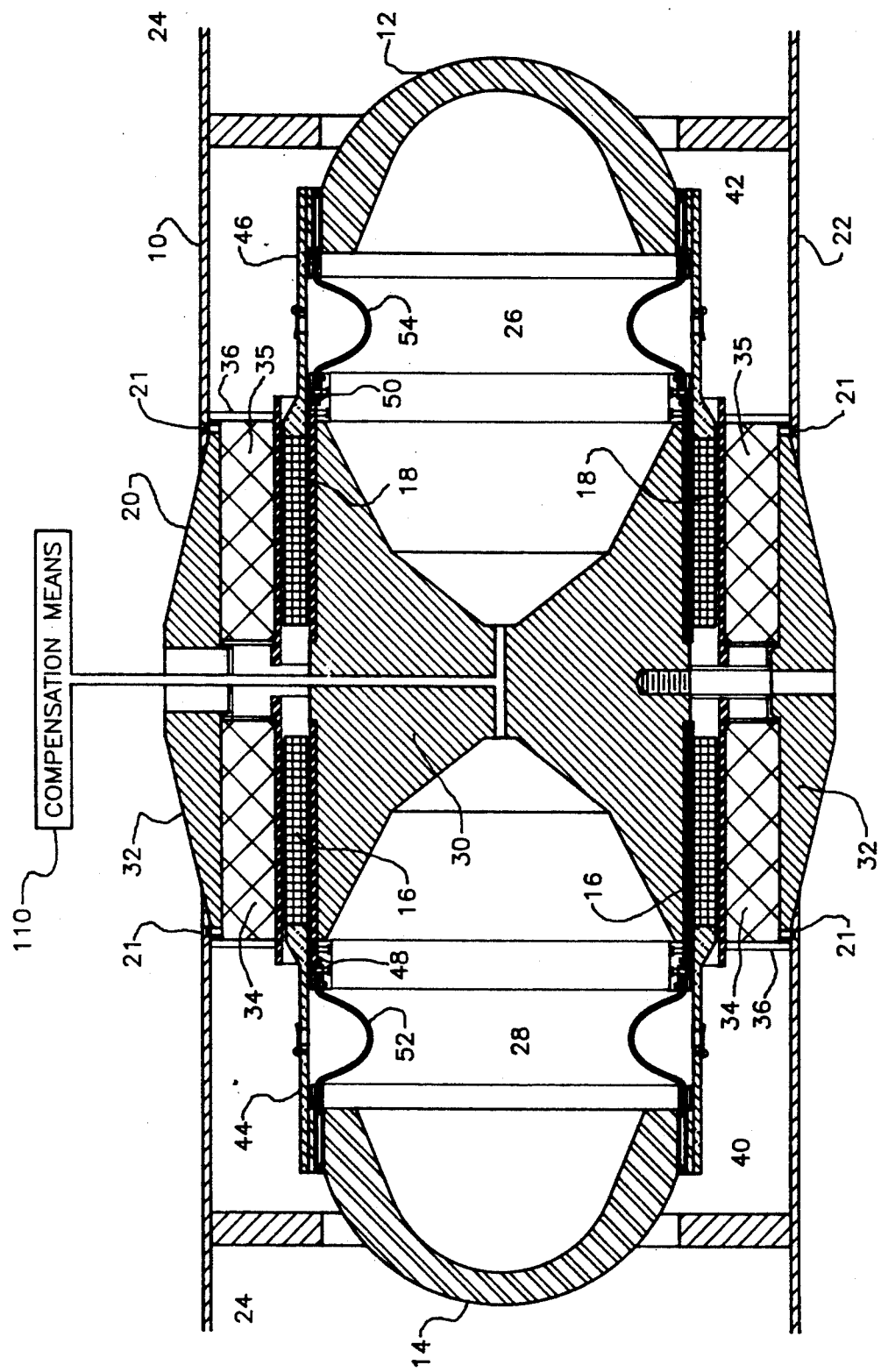
FIG. 1 is a longitudinal section view of an embodiment of the present invention.

Referring now to the drawings and particularly to FIG. 1 wherein there is depicted a first embodiment of the present invention, a sonar transducer or projector 10 is arranged with dual opposed pistons 12 and 14 connected to coils 16 and 18 that are driven by a cylindrically configured magnet assembly 20. The magnet assembly 20 is contained in and connected by a plurality of members 21 to a cylindrical transducer body 22. Acoustic energy produced by the moving pistons 12 and 14 is transferred to an ambient liquid 24 which may be sea water surrounding the projector 10 when it is submerged therein. Compliance chambers 26 and 28 situated adjacent to piston internal surfaces are filled with a gas which may be air. The placement shown in one of many possible configurations which can be implemented to suit a particular requirement.

In accordance with principles well known to those skilled in the art, the compliance chambers 26, 28 are provided with compensation means 110 which operate to maintain the pressure of the gas within the chambers 26, 28 equal to ambient hydrostatic pressure when the device is submerged. Since compensation means such as contemplated for use with the present invention are well known in prior art, further detailed description thereof is deemed unnecessary to a complete understanding of the invention.

Figure 2:
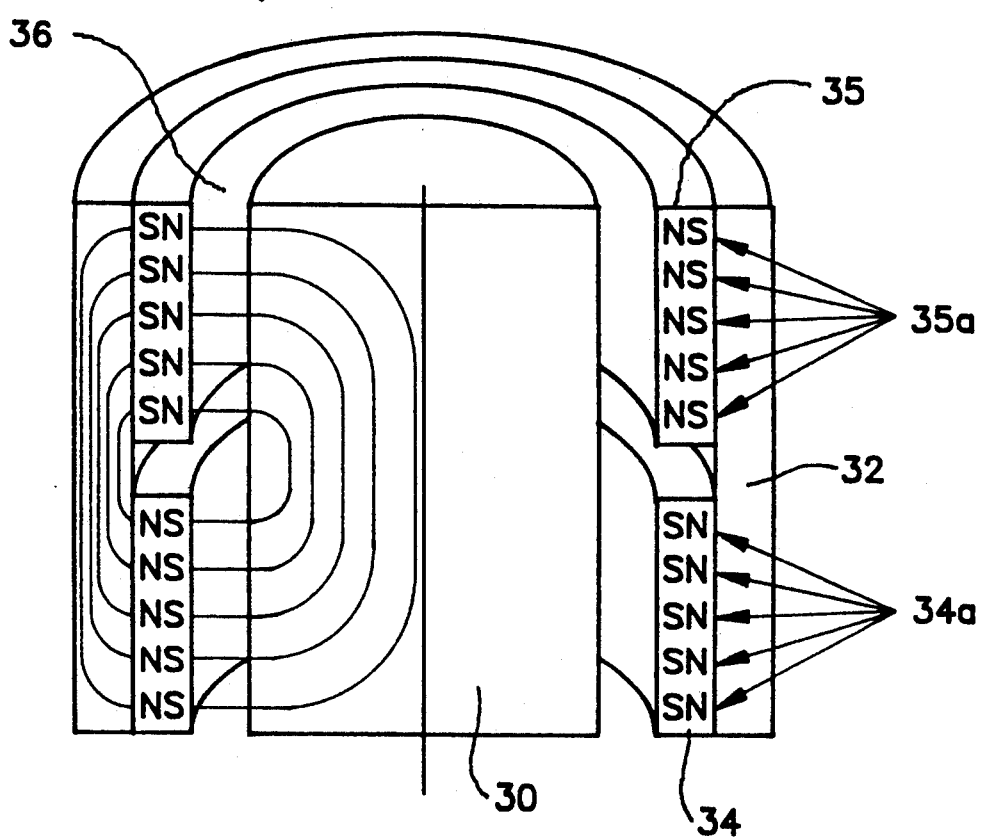
FIG. 2 is a longitudinal schematic sectional view depicting in greater detail the arrangement of the polarity of the permanent magnets of the electromagnetic drive means of the present inventions.

The magnet assembly 20 of FIG. 1, shown in greater detail in FIG. 2, consists of an inner cylindrical pole piece 30 and an outer cylindrical pole piece 32 which define therebetween an annular gap 36 within which a pair of permanent magnet members 34, 35 are located.

Inner pole piece 30 and other pole piece 32 are made of low carbon steel or pure iron.

The permanent magnet members 34, 35 consist preferably of rare earth materials such as neodymium-iron-boron material and are located between the inner pole piece 30 and outer pole piece 32 in the annular void or gap 36 between the two. The moving coils 16 and 18 are also situated within the gap 36 radially inwardly of the permanent magnet members 34, 35.

As best seen in FIG. 2, the permanent magnet members 34, 35 are each comprised of a plurality of radially poled permanent magnets 34a, 35a, respectively. It will be noted that the permanent magnets 34a of the member 34 are poled oppositely to the permanent magnet members 35a of the member 35.

The lines of flux developed by the members 34 and 35 are depicted schematically in FIG. 2. It will be seen that each pair of permanent magnets 34a, 35a form a series magnetic circuit established with flux flowing through one of the pole pieces 30, 32 and then through a companion magnet 34a or 35a through the other of the pole pieces 30, 32 and back to the opposite pole of the first magnet 34a, 35a.

The cylindrical or annular coils 16 and 18, shown in FIG. 1, travel axially in an opposed reciprocating fashion within the air gap 36 and drive the pistons 12, 14 whereby the pistons move to the left and right as seen in FIG. 1. As they move, the coils 16, 18 are maintained within the magnetic field of the permanent magnets.

In the specific embodiment shown in FIG. 1, the interior of the cylindrical transducer body 22 is open to the ambient environment and thus sea water is permitted to flow within spaces 40 and 42 and through the annular gap 36. Thus, liquid or sea water flows in contact with the electromagnetic coils 16, 18 thereby providing an efficient heat transfer medium to the ambient sea water.

Each piston 12, 14 operates to receive energy from the coils 16, 18 by means of connectors 44, 46 and to convert this energy to sound energy through its outer surface radiating into the ambient sea water. Each piston assembly also includes a bearing and seal assembly 48, 50 which permits axial movement of the piston while maintaining the chambers 26, 28 sealed. The assemblies 48, 50 each include a resilient sealing member 52, 54 respectively.

It should be understood that the principal advantages of the invention arise as a result of the structure of the permanent magnet means 35, 36 and of the arrangement of the coils 16, 18 within the air gap 36. As was previously pointed out, one problem which arises with regard to the weight of acoustic transducers is the weight associated with the iron pole pieces which are necessary to carry the magnetic flax.

In order to better explain the benefits of the present invention, an analogy will be drawn with electrical circuits wherein copper, or other conductive material is needed to carry current. The objective of a magnetic circuit is to deliver a specific amount of energy density (Joule/m3) to a remote volume of space just as an electrical circuit must deliver an energy rate (J/sec) to a remote electrical load.

In electrical circuits the amount of conductive material required may be minimized by increasing voltage and reducing current. This of course, relies upon changing the characteristics of the electrical load. The same technique can be applied in magnetic circuits by analogously increasing the linear magnetomotive force H (expressed in Oersteds). A corresponding decrease in flux $\theta$ (expressed in Webers) will result in a constant energy density in the air gap. So as with the electrical load, the air gap characteristics must be changed accordingly.

Thus, by changing certain characteristics of the magnetic circuit, reduced flux associated with the new design parameters will reduce the amount of iron required for the pole pieces thereby reducing the overall weight and volume of the device without reducing total output.

In the present invention this is accomplished by arranging the permanent magnet members as shown in FIGS. 1 and 2 with the coil members 16, 18 arranged radially within the members 34, 35 within the air gap 36 and with the permanent magnets of the member 34 being radially poled oppositely to the permanent magnets of the member 35. As a result, series magnetic circuits are developed thereby decreasing total flux in a manner which will enable reduction in the size of the pole pieces without reducing energy output.

The present invention has been shown described herein in what is considered to be the most practical and preferred embodiments. It is recognized, however, that departures may be made therefrom within the scope of the invention and that obvious modifications will occur to those skilled in the art.

What is claimed is:

1. In a sonar projector for underwater operation including:

piston means mounted for oscillatory movements to generate sound energy and arranged to have a side in communications with open sea water on the exterior of said projector when said projector is submerged therein;

electromagnetic means including inner and outer cylindrical pole pieces arranged concentrically relative to each other to define an annular gap therebetween, permanent magnet means disposed between said cylindrical pole pieces, and movable coil means arranged within said annular gap activated through said permanent magnet means and connected to drive said piston means;

compliant means comprising gas means on another side of said piston means opposite said side; and compensation means for maintaining a pressure of said gas means equal to ambient hydrostatic pressure;

the improvement comprising:

that said permanent magnet means are formed in two coaxial members which are longitudinally juxtaposed, with each of said members comprising a plurality of permanent magnets radially poled in the same direction;

that the permanent magnets of one of coaxial members are radially poled oppositely to the permanent magnets of the other of said coaxial members; and that said movable coil means are located within said annular gap radially adjacent said coaxial members.

2. A projector according to claim 1 wherein said movable coil means is located radially inwardly of said coaxial members.

3. A projector according to claim 1 wherein said movable coil means comprise a pair of movable coils each arranged respectively radially adjacent one of said coaxial members.

4. A projector according to claim 1 wherein each of the permanent magnets of one of said coaxial members are arranged to form a series magnetic circuit with one of the permanent magnets of the other of said coaxial members.

5. An electromagnetic assembly for driving a pair of opposed pistons in a sonar projector comprising a pair of concentric pole pieces having an annular gap therebetween, a pair of movable coils connected to drive said pistons located within said annular gap and a pair of coaxial longitudinally juxtaposed permanent magnet members aligned within said annular gap to energize said movable coils, each of said permanent magnet members comprising individual permanent magnets arranged to form a series magnetic circuit with a permanent magnet of the other of said permanent magnet members.

* * * * *